ary Office 2,696,468
Patented Dec. 7, 1954

2,696,468

CONDUCTIVE OIL-BASE DRILLING FLUIDS

Paul W. Fischer, Whittier, Calif., assignor to Union Oil Company of California, Los Angeles, Calif., a corporation of California No Drawing. Application April 25, 1952,
Serial No. 284,451

23 Claims. (Cl. 252—8.5)

This invention relates to oil-base drilling fluids, and in particular concerns oil-base drilling fluids which are electrically conductive. It further relates to means for rendering oil-base drilling fluids electrically conductive.

In drilling oil or gas wells by means of rotary drilling tools, a hollow drill pipe having a bit attached to its lower end is extended downwardly through the well bore and is rotated while the bit is pressed against the working face in the formation at the bottom of the hole. The action of the rotating bit grinds away the formation as the drilling progresses. During the drilling a fluid body known as a drilling fluid is continuously circulated down through the drill stem, through the bit and against the working face of the hole, and then back up to the surface through the annular space between the drill stem and the walls of the bore hole. The drilling fluid serves a number of purposes, among which are cooling and lubricating the drill bit, suspending and removing cuttings from the bore hole, preventing the flow of liquids from the formations traversed by the bore into the same by exerting a hydrostatic pressure on such formations, and fulfilling other purposes.

In locations where the underground formations traversed and/or penetrated by the bore contains materials such as hydratable clays which swell and/or disintegrate in the presence of water, it has become customary to employ drilling fluids which are relatively free of water, e. g., fluids which contain less than about 10 per cent of water, in order to preclude or minimize the introduction of water into the bore by means of the drilling fluid. Such drilling fluids are termed "oil-base" fluids since they almost invariably comprise a mineral oil having dispersed or suspended therein minor proportions of various agents adapted to impart the requisite physical properties to the base oil. Among the most important of such agents are: weighting agents, which are high density inert solids adapted to increase the apparent density of the base oil and thus increase the hydrostatic head provided by the drilling fluid within the bore; wall-building agents, which are materials such as clay or asphalt adapted to coat or plaster the walls of the bore with an impermeable layer which prevents escape of the drilling fluid into permeable formations; and dispersing agents, which serve to maintain solid components of the fluid uniformly dispersed therein.

Among the various methods for investigating and determining the nature of the subsurface formations traversed by a well bore, i. e., well logging, those involving the measurement of one or more of the electrical characteristics of such formations enjoy wide application. Most of such methods require that the bore hole be filled with a liquid capable of conducting relatively low voltage electric currents, and it is hence highly desirable that the drilling fluid employed in drilling the well be adapted for such use, i. e., the drilling fluid should have relatively good electrical conductivity. In general, however, oil-base drilling fluids are not sufficiently conductive to adapt them for use during electric logging operations, and this deficiency has greatly restricted their general applicability despite their other highly desirable properties and characteristics. Typically, oil-base drilling fluids have electrical resistivities of the order of $1 \times 10^8$ ohm-cms., which is far too high to permit their use in electric logging operations where it is usually desirable that the bore hole fluid have a resistivity not greater than about $50 \times 10^3$ ohm-cms. and preferably below about $5 \times 10^3$ ohm-cms.

Inasmuch as oil-base drilling fluids normally contain a small amount of water, usually about 0.5–5 per cent by weight of the entire composition, it would appear that their electrical resistivity could be decreased simply by adding to the fluid a water-soluble electrolyte which would dissolve in the water to form an electrically conductive phase within the body of the fluid. I have found, however, that the addition of electrolytes such as sodium phosphate, sodium chloride, calcium chloride, etc. to oil-base drilling fluids has little effect on the electrical conductivity of the fluid, and, furthermore, often adversely affects other properties of the fluid. For example, the addition of about 2 per cent by weight of sodium phosphate to a soap-stabilized drilling fluid of the type described in U. S. Patent 2,542,020 not only fails to reduce electrical resistivity appreciably but also increases the fluid loss value by more than fourfold. In this respect, the oil-base drilling fluids to which the present invention relates differ markedly from the so-called emulsion-base fluids. The latter, whether they be of the oil-in-water or water-in-oil type, contain a minimum of about 10 per cent by weight of water and when they contain about 20 or more per cent of water they can more or less readily be rendered electrically conductive without adversely affecting their fluid loss characteristics simply by dissolving an ionizable salt in the aqueous phase. Oil-base drilling fluids, on the other hand, derive their desirable characteristics from the fact that they contain a minimum amount, e. g. less than about 10 per cent, of water and in contrast to the emulsion-base fluids, they cannot be rendered conductive simply by the addition of an ionizable salt or other electrolyte. It will accordingly be understood that the term "oil-base fluid," as herein employed, refers to drilling fluid compositions in which the base fluid is mineral oil and in which the water content is less than about 10 per cent by weight.

I am aware that certain specific oil-base drilling fluids, i. e. those which contain a mixture of alkali-metal and alkaline-earth metal soaps of heat-treated rosin acids can be rendered conductive by incorporating in the fluid carefully controlled amounts of sodium silicate. However, in order to gain the benefit of the use of sodium silicate in this manner, it is necessary that the amount of alkaline-earth metal soap employed and the water content of the fluid be likewise very carefully controlled. For best results it is necessary to employ a homogenizer to insure adequate dispersion of the sodium silicate in the base fluid. As will be apparent to those skilled in the art, such careful control of proportions and unconventional mixing procedure is very difficult to achieve under field conditions where inadequate mixing facilities render almost impossible the preparation of completely uniform compositions and where the fluid is constantly subject to contamination.

It is accordingly an object of the present invention to provide improved oil-base drilling fluids suitable for use in electric well-logging operations.

Another object is to provide oil-base drilling fluids having good electrical conductivity.

A further object is to provide means for improving the electrical conductivity of oil-base drilling fluids, which means are adapted to use under actual field conditions and do not adversely affect other desirable properties of the drilling fluid to any substantial extent.

A still further object is to provide a composition of matter adapted to imparting the property of electrical conductivity to oil-base drilling fluids which are normally substantially non-conductive.

Other objects will be apparent from the following detailed description of the invention, and various advantages not specifically referred to herein will occur to those skilled in the art upon employment of the invention in practice.

I have now found that the above and related objects may be realized by incorporating an electrolyte and an emulsifying agent into the oil-base drilling fluid. More particularly, I have found that the electrical resistivity of oil-base drilling fluids may be reduced to values within the range required for electric logging operations by adding to the fluid relatively small amounts each of a water-soluble ionizable metallic compound, i. e., an electrolyte, and certain types of emulsifying agents. In many instances the normal water content of the oil-base fluid will be sufficient to dissolve the added electrolyte, but in other cases a small amount of water is added for this purpose. In order to retain the desirable general characteristics of oil-base drilling fluids, however, the water content should be maintained below about 10, preferably between about 4 and about 8, per cent by weight of the entire composition.

The water-soluble ionizable metallic compounds which are employed in accordance with the invention to impart electrical conductivity to oil-base drilling fluids are for the most part water-soluble salts of the alkali- and alkaline-earth metals and alkali-metal hydroxides. In accordance with customary nomenclature the ammonium radical is herein included within the term "alkali-metal." Water-soluble salts of the heavy metals are not inoperable insofar as initially imparting electrical conductivity to the fluid is concerned, but because of the tendency of such salts to hydrolyze in aqueous solution to form insoluble hydroxides, their effect on electrical conductivity is not usually permanent. Specific examples of the foregoing class of water-soluble ionizable metal compounds employed in practice of the invention include the hydroxides of sodium, potassium and lithium, sodium chloride, barium chloride, potassium iodide, ammonium chloride, calcium bromide, magnesium chloride, calcium nitrate, barium nitrate, magnesium nitrate, sodium sulfate, potassium sulfate, magnesium sulfate, sodium carbonate, lithium carbonate, potassium bicarbonate, sodium silicate, potassium silicate, sodium phosphate, ammonium phosphate, sodium polyphosphate, potassium bisulfate, sodium sulfite, sodium acetate, potassium arsenate, sodium borate, potassium dichromate, sodium cyanide, calcium nitrite, ammonium hydrogen phosphate, sodium thiosulfate, sodium chromate, sodium molybdate, potassium phosphite, sodium manganate, etc. Mixtures of such compounds may likewise be employed. In general, best results are obtained by employing compounds which dissociate in water to form alkaline solutions, i. e., hydroxides and salts of strong bases and weak acids. The alkali-metal hydroxides, silicates, and phosphates are particularly preferred.

The emulsifying agents which are employed in conjunction with the aforementioned electrolytes in accordance with the invention are sulfated or sulfonated organic compounds which promote the formation of oil-in-water emulsions. These agents are characterized by containing either the sulfate group, $ROSO_3M$, or the sulfonate group $RSO_3M$, wherein R represents an organic radical and M represents hydrogen or an alkali-metal. They may be classified into four recognized groups:

*Group I, sulfated oils.*—The emulsifying agents of this group are formed by reaction between an animal or a vegetable oil and sulfuric acid under relatively mild conditions. Such oils are glycerides of unsaturated fatty acids which may contain hydroxyl groups. The sulfated products are often termed "sulfonated" oils, but it has been established that they are sulfates rather than sulfonates. They may be employed as the free acid or as the alkali-metal or ammonium salt thereof. A number of such sulfated oils and mixtures thereof are available commercially under various trade names, e. g., Aquasol AR, Hartex Oil K-40, Monopole Oil, Nopco 1935, Nopco 1471, etc., and include sulfated castor oil, sulfated neat's-foot oil, sulfated olive oil, sulfated lard oil, etc. and the alkali-metal salts thereof.

*Group II, sulfated alcohols.*—The emulsifying agents of this group are sulfuric acid esters of long chain fatty alcohols and the alkali-metal salts thereof, e. g., sodium lauryl sulfate, sodium cetyl sulfate, ammonium glycerylamide sulfate, sodium butylphenoxyethyl sulfate, potassium oleyl sulfate, sodium tridecanol sulfate, sodium monolaurylglyceryl sulfate, sulfated mixed higher alcohols, etc. A wide variety of such agents are commercially available under such trade names as Duponol ES, Duponol ME, Artic Syntex M, Aurinol, Gardinol, Tergitol Penetrant O8, etc.

*Group III, aliphatic and naphthenic sulfonates.*—The emulsifying agents of this group are sulfonated aliphatic and naphthenic hydrocarbons, amines, esters, ethers, etc. and the alkali-metal salts thereof. Examples of the members of this class include dioctyl sodium sulfosuccinate, dihexyl potassium sulfosuccinate, sodium beta-oyleythane sulfonate, the potassium salt of the sulfonated condensation product of oleyl chloride and 2-chloro-ethylamine, the sodium salt of the sulfonated amide of hydroxyethylamine and oleic acid, sodium mahogany soaps, green sulfonic acid soaps, sodium petroleum hydrocarbon sulfonates, sodium abietene sulfonate, etc. Many of the agents of this group are available commercially under such trade names as Aerosol OT, Aerosol MA, Artic Syntex A, Artic Syntex B, Igepon A, Igepon T, Petronate, Saponate, MP-189, Esterol, etc.

*Group IV, aromatic sulfonates.*—The emulsifying agents of this group are sulfonated aromatic compounds and the alkali-metal salts thereof. Usually the aromatic nucleus bears an alkyl side-chain. Examples include sodium isopropylnaphthalene sulfonate, potassium dodecylbenzene sulfonate, ammonium tetrahydronaphthalene sulfonate, monoethyl phenylphenol sodium sulfonate, sodium cetylnaphthalene sulfonate, sulfonated oleyl esters of phenolaldehyde condensation products, sodium oleylphenoxyacetate sulfonate, sulfonaphthylstearic acid, etc. Many of such products are commercially available under such trade names as Aerosol OS, Alkanol B, Alkanol S, Darvan, Daxad, Nacconal NRSF, Neomerpin, Santomerse 1, Oronite, etc.

Many further examples of the emulsifying agents of the present class, together with their respective trade names and manufacturers, are listed in Industrial and Engineering Chemistry, vol. 35, pp. 107–117 and 126–130 (1943). Of these agents, those of group IV are preferred in the practice of the present invention by reason of their high emulsifying powers, whereas those of group I are least preferred since they must be employed in relatively high concentration.

The proportions in which the water-soluble metal salt or hydroxide and the emulsifying agent are incorporated in the drilling fluid are to a certain extent interdependent, i. e., with increasing amounts of the metal compound the amount of emulsifying agent may be decreased, and vice versa. Also, certain particular metal compounds require the presence of more of a particular emulsifying agent than others, and as previously stated certain types of emulsifying agents are more effective in a given amount than others. In general, however, the water-soluble metal salt or hydroxide is provided in an amount representing between about 0.01 and about 5 per cent, preferably between about 0.1 and about 2 per cent, by weight of the entire composition, and the emulsifying agent is employed in an amount representing between about 0.1 and about 8 per cent, preferably between about 0.4 and about 4 per cent, by weight of the entire composition.

As previously stated, it is necessary that the drilling fluid contain sufficient water to dissolve the water-soluble metal salt or hydroxide so that the latter becomes dispersed in the fluid in the form of a relatively dilute solution. In many instances the drilling fluid will normally contain sufficient water for this purpose, in which case no water need be added along with the metal salt or hydroxide. In some instances, however, it will be necessary to add a small amount of water. In general, it is desirable that the drilling fluid contain at least about 3 per cent, preferably at least about 5 per cent, by weight of water. The upper limit on the water content of the fluid is established at about 10 per cent by weight since those fluids which contain substantially greater amounts of water lose the desirable characteristics of oil-base drilling fluids in general, and are more properly classifiable as emulsion-base fluids.

The use of a water-soluble metal salt or hydroxide in combination with an emulsifying agent of the above-defined class in accordance with the invention is applicable to oil-base drilling fluids in general, regardless of their exact formulation. In general, all oil-base drilling fluids essentially comprise a mineral oil dispersion of solids and a dispersing agent which serves to maintain the solids more or less stably dispersed in the oil. When a hydratable clay is included as a wall-building agent the fluid usually also contains a small quantity of water. Almost invariably the base oil is a mineral oil, and may be crude oil, a distillate, or a residual fraction. Very often blends of distillate and residual fractions are employed, e. g., a blend of a light distillate such as kerosene or diesel fuel and a light residual fraction such as furnace oil or a light fuel oil. The dispersed solids may serve solely as a weighting agent, in which case they usually take the form of finely-divided inert metallic compounds such as lead dust, barytes, iron oxide, calcined clay, whiting and the like, or they may serve as wall-building agents to coat or plaster the walls of the bore with an impermeable layer which prevents escape of the drilling fluid into permeable formations traversed by the bore. Such wall-building agent usually comprises a hydratable clay such as bentonite, in which case a small amount of water is included in the fluid for the purpose of effecting hydration of the clay. Asphalt is also employed as a wall-building agent. In many instances the dispersed solids may comprise both a weighting agent and a wall-building agent. A wide variety of materials may be employed as dispersing or suspending agents to maintain the solids uniformly dispersed in the base oil. For the most part, however, the dispersing agent will comprise a metal soap of a fatty, resin or naphthenic acid. In some instances such soaps are formed in situ by incorporating into the fluid a soap-forming acid, such as tall oil, rosin, oleic acid, sulfonic acid, linoleic acid, linseed acids, and the like and a basic inorganic compound such as sodium hydroxide, lime, or sodium silicate. In other cases the soap may be formed in situ by incorporating an alkali-metal soap and an alkaline earth metal base into the fluid, whereby a metathesis reaction occurs to form the corresponding alkaline-earth metal soap. Soap mixtures, including mixtures of water-dispersible and oil-dispersible soaps may also be employed. In addition to the soap-type dispersing agents, such materials as lampblack and diatomaceous earth have been employed for the same purpose.

While the principle of the invention is applicable broadly to all types of oil-base drilling fluids, it is particularly applicable to the soap-stabilized fluids of the type described in U. S. Patent 2,542,020. Such fluids are prepared by dispersing small amounts each of a hydratable clay, an alkaline-earth metal base, and an alkali-metal soap of a heat-treated rosin in a suitable base oil. A partial metathesis reaction occurs between the rosin soap and the alkaline-earth metal base whereby there is obtained a mixture of the corresponding alkaline-earth metal rosin soap and unreacted alkali-metal rosin soap. The alkali-metal rosin soap employed in preparing this type of drilling fluid is obtained by reacting an alkali-metal alkali, e. g. sodium or potassium hydroxide, with heat-treated wood or gum rosin in such a manner that the reaction is only partially complete and the saponified product contains from about 1 to about 15 per cent of free unsaponified resin acids.

The heat-treatment of rosin, whereby the resin acids thereof are isomerized and/or otherwise modified, is well known in the naval stores art, and may be effected in various ways to obtain modified rosin products which vary somewhat in their physical and chemical properties depending upon the nature and extent of the heat-treatment. Thus, any of the various color grades of refined wood or gum rosin may be heated under non-oxidizing conditions at temperatures between about 250° C. and about 350° C. for a length of time sufficient to raise the specific rotation of the rosin from its original negative value to a value between about +5° and about +15°. The resulting rosin product closely resembles the original rosin in appearance, ease of saponification, etc., but is considerably altered chemically as evidenced by its increased specific rotation, increased dehydroabietic acid content, lower iodine number, etc. By carrying out the heat-treatment at somewhat higher temperatures and/or over longer periods of time, the specific rotation may be raised further, e. g., to +25° or even higher, and the degree of olefinic unsaturation further decreased. Also, under such conditions decarboxylation takes place with the formation of unsaponifiable bodies which are usually referred to as rosin oils. The heat-treatment of rosin to secure to desired modification of the resin acids as indicated by increase in specific rotation to a value above about +5° may also be effected in the presence of catalysts at relatively low temperatures as described in U. S. Patent 2,154,629. The catalysts employed are of the hydrogenation type, e. g., metallic platinum or palladium, although the treatment is carried out in the absence of added hydrogen. The reaction which takes place is termed "disproportionation" since it involves the simultaneous hydrogenation and dehydrogenation of abietic-type acids with the consequent formation of dihydroabietic and dehydroabietic acids and their analogues, and the resulting product is referred to as "disproportionated rosin." Similarly, the product obtained by heat-treating rosin under conditions sufficiently drastic that carboxyl groups are removed from the rosin acids is termed "decarboxylated rosin," and the product obtained by heat-treating rosin under less drastic conditions so that the change effected is substantially only one of molecular rearrangement is referred to as "isomerized rosin." All of these modified rosin products are characterized by having been prepared by heat-treating rosin under conditions of time and temperature, and in the presence or absence of a hydrogenation catalyst but in the absence of added hydrogen, sufficient to raise the specific rotation of the rosin to a value above about +5°.

Any of the above described modified rosin products may be used to obtain the saponification products employed in preparing the preferred drilling fluid compositions of the present invention. Procedure for carrying out the saponification reaction is well known in the art, and in general consists merely of adding the modified rosin in the solid or molten state to a hot aqueous solution of the desired alkali-metal alkali and thereafter heating the mixture until the reaction is complete and the product contains the desired amount of water. The amount of alkali employed is somewhat less than that required for the complete saponification of the resin acids in order that the saponification product may contain the requisite amount of free unsaponified resin acids. The concentration of the aqueous alkali is usually so adjusted that the product obtained takes the form of a viscous liquid or thick paste containing 60–85 per cent solids. The physical form of the product also depends somewhat upon the type of modified rosin employed. The saponification product obtained from decarboxylated wood rosin containing a substantial amount of rosin oils, for example, is a relatively fluid liquid even though it may contain only 5–10 per cent of water.

While any of the alkali-metal alkali saponification products of rosin which has been heat-treated to raise its specific rotation to a value above about +5° may be employed in preparing the oil-base drilling fluids, I have found that superior results, particularly with respect to the fluid loss value of the drilling fluid are attained by employing either of two specific products of this type. The first of such preferred saponification products is an alkali-metal alkali saponification product of rosin which has been heat-treated at temperatures between about 250° C. and about 350° C. in the absence of a catalyst to such an extent that it contains only about 50–60 per cent of free resin acids, 30–40 per cent of unsaponifiable oils, and small amounts of phenolic materials, water, and products of unknown constitution. A particularly preferred product of this type is the potassium hydroxide saponification product of such heat-treated rosin containing about 45–55 per cent potassium resin acid soaps, about 30–35 per cent unsaponifiable materials, about 5–10 per cent free resin acids, and about 5–10 per cent water. The second of the preferred class of saponification products is the product obtained by heating rosin at a temperature of about 225°–300° C. for about 15–60 minutes in contact with a hydrogenation catalyst but in the absence of added hydrogen, distilling the resulting product and collecting a fraction distilling at about 210°–275° C. under about 5–10 mm. pressure, and thereafter saponifying such fraction with aqueous sodium hydroxide in the known manner. Such product is available commercially under the trade name "Dresinate 731." Mixtures of these two types of saponified heat-treated rosin products may also be employed.

The proportions in which the components of this type of drilling fluid are employed may be varied between certain limits depending on the identity of such components and the specific properties desired in the composition. Ordinarily, however, the saponified heat-treated rosin product is employed in an amount representing between about 1 and about 10, preferably between about 4 and about 8, per cent by weight of the entire composition. The alkaline-earth metal base, which is preferably calcium hydroxide or calcium oxide, is employed in an amount corresponding approximately to that chemically equivalent to the saponified rosin product. When the latter is one of the preferred products hereinbefore described and the alkaline-earth metal base is calcium oxide or hydroxide, the saponification product is provided in the above-mentioned amount and the base is employed in an amount representing between about 0.1 and about 5, preferably between about 0.4 and about 2, per cent by weight of the entire composition. The hydratable clay is employed in an amount representing between about 0.1 and about 5, preferably between about 0.4 and about 1.2, per cent by weight of the entire composition, and the water is provided in an amount representing between about 0.2 and about 10, preferably between about 1 and about 5, per cent by weight of the entire composition. These proportions of water include any water which may be contained in the saponified rosin product and/or other components, and accordingly the amount of water actually added during preparation of the composition will be adjusted according to the water content of the other components so that the final composition will contain water in the above-mentioned proportions.

In determining the electrical resistivity of the drilling fluids provided by the invention, an electrode assembly comprising two 1-inch square nickel plates spaced about one inch apart is immersed in a sample of the fluid being tested, and the voltage which must be applied across the electrodes to obtain a predetermined current flow through the fluid (usually 400 milliamperes) is ascertained. By calibrating the electrode assembly against a liquid of known resistivity, the resistivity of the fluid sample being tested may be determined from such voltage reading. It has been found, however, that many drilling fluids undergo a dielectric breakdown during such testing procedure. Thus, when the fluid is first subjected to the test the voltage across the electrodes may be increased to a relatively high value, e. g., 130 volts, before substantial current flows. As soon as the current starts to flow, however, the voltage may be substantially reduced without a corresponding reduction in the flow of current. Accordingly, in making the resistivity determination, the electrode assembly is immersed in the fluid and the voltage applied to the electrode plates is gradually raised until the predetermined flow of current is obtained. A so-called "initial resistivity" value is determined from the applied voltage. The voltage is then gradually reduced, and the minimum voltage required to maintain the predetermined current flow is ascertained, and a so-called "ultimate resistivity" value is determined from such minimum voltage reading. The dielectric breakdown of the fluid is more or less permanent and the ultimate resistivity value represents the resistivity which the fluid will have during electric logging operations.

The following examples will illustrate a number of ways in which the principle of the invention has been applied, but are not to be construed as limiting the same.

EXAMPLE I

The following concentrate composition was prepared:

| | Parts by weight |
|---|---|
| Diesel fuel | 2800 |
| Saponified decarboxylated rosin | 1400 |
| Saponified disproportionated rosin | 1400 |
| Bentonite | 840 |
| Water | 560 |

The diesel fuel was a light domestic diesel oil having an API gravity of about 31°, a viscosity of about 40 SUS at 100° F. and a boiling range of about 400°–720° F. The saponified decarboxylated rosin contained 45–55 per cent of potassium resin acid soaps, 30–55 per cent of unsaponifiable rosin oils, 5–10 per cent of free resin acids and 5–10 per cent of water. The saponified disproportionated rosin was the hereinabove described "Dresinate 731."

This concentrate composition was then partially diluted with a further quantity of the diesel fuel in a ratio of 3 gallons of diesel fuel per 2 gallons of concentrate, and the partially diluted concentrate was then further diluted with fuel oil in a ratio of 17 gallons of fuel oil per 5 gallons of the partially diluted concentrate. Approximately 740 parts by weight of calcium oxide were then stirred into the completely diluted concentrate. The fuel oil was a light domestic fuel oil having an API gravity of about 14.5°, a viscosity of about 36 SSF at 127° F. and a flash point of 170° F.

The finished drilling fluid had the following approximate composition:

| | Per cent by weight |
|---|---|
| Domestic diesel fuel | 15.7 |
| Light domestic fuel oil | 77.7 |
| Saponified decarboxylated rosin | 1.9 |
| Saponified disproportionated rosin | 1.9 |
| Calcium oxide | 0.9 |
| Water | 0.8 |
| Bentonite | 1.1 |
| | 100.0 |

The following Table I presents data illustrating the effect of adding various electrolytes in combination with water and one of the emulsifying agents of the present class to the above drilling fluid. In each experiment, the indicated proportions of the electrolyte, water and emulsifying agent were stirred into a 1500 ml. sample of the drilling fluid, and the electrical resistivity of the resulting composition was determined as hereinbefore described.

Table I

| Expt. No. | Electrolyte | | Water, Percent[1] | Emulsifying Agent | | Resistivity, Ohm-cms.×10³ | |
|---|---|---|---|---|---|---|---|
| | Identity | Percent[1] | | Identity | Percent[1] | Initial | Ultimate |
| 1 | None | 0.0 | 0.0 | None | 0 | 1,000 | 1,000 |
| 2 | Sodium Chloride | 0.6 | 6.7 | Sodium alkyl aryl sulfonate[2] | 3.6 | 11 | 11 |
| 3 | Sodium Carbonate | 0.6 | 6.7 | ----do---- | 3.6 | <1 | <1 |
| 4 | Sodium Acetate | 0.6 | 6.7 | ----do---- | 3.6 | 70 | 26 |
| 5 | Sodium Hydroxide | 0.6 | 6.7 | ----do---- | 3.6 | 34 | 20 |
| 6 | Sodium Silicate | 0.6 | 6.8 | ----do---- | 2.4 | 100 | 30 |
| 7 | Trisodium Phosphate | 0.6 | 6.8 | ----do---- | 2.4 | 90 | 22 |
| 8 | Trisodium Polyphospate | 0.6 | 6.8 | ----do---- | 2.4 | 33 | 16 |
| 9 | Versene[3] | 0.6 | 6.8 | ----do---- | 2.4 | 90 | 16 |
| 10 | Sodium Bicarbonate | 0.6 | 6.8 | ----do---- | 2.4 | 90 | 34 |
| 11 | Calcium Chloride | 0.08 | 8.6 | ----do---- | 2.4 | 45 | 5 |
| 12 | Trisodium Phosphate | 0.9 | 6.8 | ----do---- | 1.2 | 102 | 50 |
| 13 | ----do---- | 0.9 | 6.8 | ----do---- | 2.4 | 100 | 30 |
| 14 | ----do---- | 0.9 | 6.8 | ----do---- | 4.8 | 42 | 16 |
| 15 | ----do---- | 0.9 | 6.8 | ----do---- | 9.5 | <1 | <1 |
| 16 | None | 0.0 | 6.8 | ----do---- | 1.2 | 1,000 | 1,000 |
| 17 | Calcium Chloride | 0.08 | 8.6 | None | 0.0 | 1,000 | 1,000 |

[1] Based on weight of entire composition.
[2] "Oronite Wetting Agent S" manufactured by Oronite Chemical Company.
[3] A sodium ethylene diamine tetra-acetate.

EXAMPLE II

The data presented in the following Table II illustrates the use of a number of different emulsifying agents of the present class in accordance with the principle of the invention. In each experiment, approximately 100 parts of water, 10 parts of trisodium phosphate and 40 parts of the indicated emulsifying agent were added to 1500 parts of the oil-base drilling fluid prepared in Example I. The resulting fluid had the following approximate composition:

| | Per cent by weight |
|---|---|
| Oil-base drilling fluid | 90.2 |
| Trisodium phosphate | 0.6 |
| Water | 6.8 |
| Emulsifying agent | 2.4 |
| | 100.0 |

Table II

| Expt. No. | Emulsifying Agent | Resistivity, Ohm-cms.×10³ | |
|---|---|---|---|
| | | Initial | Ultimate |
| 18 | Sodium alkyl aryl sulfonate [1] | 102 | 30 |
| 19 | Sulfated castor oil | 82 | 30 |
| 20 | Sodium petroleum sulfonate [2] | 56 | 25 |
| 21 | Sodium petroleum sulfonate [3] | 3 | <1 |
| 22 | Sodium lauryl sulfate | 68 | 24 |
| 23 | Di-octyl sodium sulfosuccinate | 100 | 30 |

[1] Oronite Wetting Agent S, manufactured by Oronite Chemical Company.
[2] Mahogany acid soaps.
[3] "Green Acid" soaps.

EXAMPLE III

Approximately 90 parts of tall oil, 45 parts of sodium silicate (N Grade), 150 parts of air-blown asphalt and 45 parts of 50% aqueous sodium hydroxide were stirred into about 500 parts of light diesel fuel, and the resulting composition was diluted with about 540 parts of light domestic fuel oil. The resulting oil-base drilling fluid was stirred for one hour, after which it was divided in 1500 part portions. To each portion there was then added 100 parts of water and 40 parts of sodium alkyl aryl sulfonate (Oronite Wetting Agent S). Approximately 10 parts of the salt indicated in the following Table III were then added to each of the portions of the drilling fluid, and the resistivities of the resulting compositions were determined.

Table III

| Expt. No. | Salt | Resistivity, Ohm-cms.×10³ | |
|---|---|---|---|
| | | Initial | Ultimate |
| 24 | None | 1,000 | 1,000 |
| 25 | Sodium bicarbonate | <1 | <1 |
| 26 | Versene [1] | <1 | <1 |
| 27 | Trisodium phosphate | <1 | <1 |
| 28 | Trisodium polyphosphate | <1 | <1 |
| 29 | Sodium silicate | <1 | <1 |

[1] A sodium ethylene diamine tetra-acetate.

EXAMPLE IV

Approximately 400 parts of a commercial drilling fluid concentrate comprising asphalt and lime were stirred into 980 parts of light diesel fuel. The resulting drilling fluid was divided into 1500 part portions, and to each portion was added 100 parts of water, 40 parts of sodium alkyl aryl sulfonate (Oronite Wetting Agent S), and 10 parts of the salt indicated in the following Table IV. The resistivity of each sample is indicated in the table:

Table IV

| Expt. No. | Salt | Resistivity, Ohm-cms.×10³ | |
|---|---|---|---|
| | | Initial | Ultimate |
| 30 | None | 1,000 | 1,000 |
| 31 | Sodium bicarbonate | 2 | 1 |
| 32 | Trisodium phosphate | 4 | 7 |
| 33 | Trisodium polyphosphate | <1 | <1 |

The foregoing examples illustrate the use of various electrolytes and emulsifying agents of the present class for imparting electrical conductivity to several different types of freshly-prepared oil-base drilling fluids. In many instances, however, it is desirable to treat drilling fluids which have previously been used in the field. Such "field fluids" are almost invariably contaminated with calcium and/or sodium compounds, and while the principle of the present invention is broadly applicable to such drilling fluids, I have found that superior results are attained when the electrolyte comprises a mixture of an alkali-metal hydroxide and a water-soluble salt of a strong base and a weak acid, e. g., sodium silicate, sodium carbonate, sodium phosphate, etc. Such mixed electrolyte and the emulsifying agent may be added separately to the drilling fluid, but a more convenient procedure consists in preparing a pre-mixed composition which may be packaged and sold as such as a "conductivity additive" to be admixed with the drilling fluid whenever desired. Such composition suitably comprises 100 parts by weight of water, between about 10 and about 40 parts by weight of a mixture of an alkali-metal hydroxide and a water-soluble salt of a strong base and a weak acid, and between about 20 and about 80 parts by weight of one of the emulsifying agents of the present class. If desired, a water-miscible organic solvent such as isopropyl alcohol may be included to promote solubility of the emulsifying agent in the water. The electrolyte mixture will comprise from about 10 to about 90 per cent by weight of the alkali-metal hydroxide and from about 90 to about 10 per cent by weight of the water-soluble salt. In employing such a "conductivity additive" composition to impart electrical conductivity to an oil-base drilling fluid, the composition is simply stirred into the fluid in an amount equal to between about 5 and about 20 per cent by weight of the entire composition. The use of such "conductivity additive" composition is of course not limited to contaminated field fluids but is also applicable to drilling fluids which have not previously been used.

The following example illustrates the use of a mixed electrolyte in conjunction with a typical field fluid as above described:

EXAMPLE V

A simulated field fluid was prepared by adding 12 parts of calcium chloride, 30 parts of sodium chloride and 250 parts of water to 15,000 parts of the drilling fluid prepared in Example I. The resulting composition was divided into 1500 part portions and to each portion then was added 100 parts of water, 40 parts of a sodium alkyl aryl sulfonate (Oronite Wetting Agent S), and varying amounts of electrolyte as indicated in the following Table V:

Table V

| Expt. No. | Electrolyte | Resistivity, Ohm-cms.×10³ | |
|---|---|---|---|
| | | Initial | Ultimate |
| 34 | None | 100 | 85 |
| 35 | Trisodium phosphate—9 parts | 55 | 11 |
| 36 | Trisodium phosphate—3 parts / Sodium hydroxide—5 parts | 35 | 3.2 |
| 37 | Trisodium phosphate—3 parts / Sodium hydroxide—10 parts / Sodium silicate—3 parts | 7.5 | 1 |
| 38 | Sodium hydroxide—10 parts / Sodium silicate—13 parts | 2.2 | 1 |

The following examples are illustrative of typical "conductivity additive" compositions which may be employed as described above.

EXAMPLE VI

| | Parts |
|---|---|
| Sodium alkyl aryl sulfonate (Oronite Wetting Agent S) | 27 |
| Sodium hydroxide | 3 |
| Sodium silicate | 10 |
| Trisodium phosphate | 10 |
| Water | 50 |
| Isopropyl alcohol | 10 |

This composition is added to the drilling fluid in an amount representing about 10 per cent by weight of the entire composition.

EXAMPLE VII

| | Parts |
|---|---|
| Sodium mahogany sulfonate (Petronate) | 30 |
| Sodium hydroxide | 10 |
| Sodium bicarbonate | 10 |
| Water | 50 |

EXAMPLE VIII

| | Parts |
|---|---|
| Sodium lauryl sulfate | 40 |
| Potassium hydroxide | 5 |
| Sodium silicate | 20 |
| Water | 35 |

As will be apparent to those skilled in the art, many variations in the composition of the drilling fluid and/or the conductivity additives may be made without departing from the scope of the invention. The essence of the invention lies in adding to a normally non-conductive oil-base drilling mud between about 0.01 and about 5 per cent of a water-soluble metal salt or hydroxide, between about 0.1 and about 0.8 per cent of an emulsifying agent selected from the class consisting of sulfated oils and alkali-metal salts thereof, sulfated alcohols and alkali-metal salts thereof, aliphatic and naphthenic sulfonates and alkali-metal salts thereof, and aromatic sulfonates and alkali-metal salts thereof, and sufficient water to adjust the total water content of the composition to between about 3 and about 10 per cent, all of said proportions being based on the weight of the entire composition.

The conductive drilling fluids provided by the invention may be employed in any of the various well logging methods which require that one or more electrodes be positioned within a well bore filled with a conductive fluid. Certain of such methods comprise a determination of the electrical resistivity of the earth formations traversed by the bore. Others comprise measuring the so-called "self-potential" of such formation. Regardless of the exact nature of the logging method, however, the herein described drilling fluids are well adapted to use as the conductive fluid with which the bore is filled and within which an electrode is submerged.

Other modes of applying the principle of my invention may be employed instead of those explained, change being made as regards the methods or materials employed provided the compositions stated by any of the following claims, or the equivalent of such stated compositions, be obtained.

I, therefore, particularly point out and distinctly claim as my invention:

1. The method of preparing an electrically conductive oil-base drilling fluid which comprises adding to a normally non-conductive oil-base drilling fluid between about 5 and about 20 per cent by weight of a composition comprising 100 parts by weight of water, between about 10 and about 40 parts by weight of a mixture of an alkali-metal hydroxide and water-soluble salt of a strong base and a weak acid, and between about 20 and about 80 parts by weight of an emulsifying agent selected from the class consisting of sulfated oils, sulfated alcohols, aliphatic and naphthenic sulfonates, aromatic sulfonates, and the alkali-metal salts thereof.

2. A method according to claim 1 wherein the emulsifying agent is a sodium alkyl aryl sulfonate.

3. A method according to claim 1 wherein the water-soluble salt of a strong base and a weak acid is selected from the class consisting of trisodium phosphate, sodium silicate and mixtures thereof.

4. A method according to claim 2 wherein the alkali-metal hydroxide is sodium hydroxide and the water-soluble salt of a strong base and a weak acid is selected from the class consisting of trisodium phosphate, sodium silicate and mixtures thereof.

5. An oil-base drilling fluid comprising a mineral oil carrying suspended solids and sufficient of a dispersing agent to maintain said solids dispersed in said oil, between about 3 and about 10 per cent by weight of water, between about 0.01 and about 5 per cent by weight of an electrolyte selected from the class consisting of water-soluble metal salts and water-soluble metal hydroxides, and between about 0.1 and about 8 per cent by weight of an emulsifying agent selected from the class consisting of sulfated oils, sulfated alcohols, aliphatic and naphthenic sulfonates, aromatic sulfonates, and alkali-metal salts thereof, said drilling fluid being characterized by having a substantial degree of electrical conductivity.

6. An oil-base drilling fluid according to claim 5 wherein the dispersing agent is a metal soap.

7. An oil-base drilling fluid according to claim 5 wherein the dispersing agent comprises a mixture of water-dispersible and oil-dispersible resin soaps.

8. An oil-base drilling fluid according to claim 5 wherein the emulsifying agent is an alkali-metal alkyl aryl sulfonate.

9. An oil-base drilling fluid comprising a mineral oil having suspended therein a solid wall-building agent and a finely-divided inert weighting agent and sufficient of a dispersing agent to maintain said solids dispersed in said oil, between about 3 and about 10 per cent by weight of water, between about 0.01 and about 5 per cent by weight of an electrolyte selected from the class consisting of water-soluble metal salts and water-soluble metal hydroxides, and between about 0.1 and about 8 per cent by weight of an emulsifying agent selected from the class consisting of sulfated oils, sulfated alcohols, aliphatic and naphthenic sulfonates, aromatic sulfonates, and alkali-metal salts thereof, said drilling fluid being characterized by having a substantial degree of electrical conductivity.

10. An oil-base drilling fluid according to claim 9 wherein said wall-building agent is a hydratable clay.

11. An oil-base drilling fluid according to claim 9 wherein the dispersing agent is a metal soap.

12. An oil-base drilling fluid according to claim 9 wherein the emulsifying agent is an alkali-metal alkyl aryl sulfonate.

13. An oil-base drilling fluid according to claim 9 wherein the electrolyte is selected from the class consisting of alkali-metal hydroxides, alkali-metal silicates, and alkali-metal phosphates.

14. An electrically conductive oil-base drilling fluid comprising (1) a normally non-conductive drilling fluid prepared by dispersing in a mineral oil between about 1 and about 10 per cent by weight of an alkali-metal alkali saponification product of rosin which has been heat-treated at a temperature between about 250° and about 350° C. for a period of time sufficient to raise its specific rotation to a value above about $+5°$, said saponified rosin product containing between about 1 and about 15 per cent by weight of free resin acids; between about 0.1 and about 5 per cent by weight of a hydratable clay; between about 0.2 and about 10 per cent by weight of water; and an amount of an alkaline-earth metal base corresponding approximately to that chemically equivalent to said saponified rosin product; (2) between about 0.01 and about 5 per cent, based on the weight of the entire composition, of an electrolyte selected from the class consisting of water-soluble metal salts and water-soluble metal hydroxides; (3) between about 0.1 and about 8 per cent, based on the weight of the entire composition, of an emulsifying agent selected from the class consisting of sulfated oils, sulfated alcohols, aliphatic and naphthenic sulfonates, aromatic sulfonates, and alkali-metal salts thereof; and (4) sufficient water to adjust the water content of the entire composition to between about 3 and about 10 per cent by weight.

15. An electrically conductive oil-base drilling fluid according to claim 14 wherein the electrolyte is provided in an amount representing between about 0.1 and about 2 per cent by weight of the entire composition, the emulsifying agent is provided in an amount representing between about 0.4 and about 4 per cent by weight of the entire composition, and sufficient water is provided to adjust the water content of the entire composition to between about 5 and about 10 per cent by weight.

16. An electrically conductive oil-base drilling fluid according to claim 14 wherein the emulsifying agent is an alkali-metal alkyl aryl sulfonate.

17. An electrically conductive oil-base drilling fluid according to claim 14 wherein the electrolyte is selected from the class consisting of alkali-metal hydroxides, alkali-metal phosphates and alkali-metal silicates.

18. An electrically conductive oil-base drilling fluid according to claim 14 wherein the alkaline-earth metal base component of the normally non-conductive fluid is selected from the class consisting of calcium hydroxide and calcium oxide.

19. An electrically conductive oil-base drilling fluid according to claim 14 wherein the alkali-metal alkali saponification product is the potassium hydroxide saponification product of rosin which has been heated at a temperature between about 250° and about 350° C. for a period of time sufficient to raise its specific rotation to a value above about $+5°$, and comprises between about 45 and 55 per cent of potassium resin soaps, between about 30 and about 35 per cent of unsaponifiable materials, between about 5 and about 10 per cent of free resin acids, and between about 5 and about 10 per cent of water.

20. An electrically conductive oil-base drilling fluid according to claim 14 wherein the alkali-metal alkali saponification product is that obtained by heating rosin at a temperature between about 225° and about 300° C. for from about 15 to about 60 minutes in the presence of a hydrogenation catalyst but in the absence of added hydrogen, distilling the resulting product and collecting a fraction distilling between about 210° and about 275° C. under 5–10 mm. pressure, and thereafter saponifying such fraction with aqueous sodium hydroxide.

21. In a well logging method wherein at least one electrode is positioned within a well bore filled with an electrically conductive fluid, the improvement which consists in employing as said fluid the conductive oil-base drilling fluid prepared by the method defined by claim 1.

22. In a well logging method wherein at least 1 electrode is positioned within a well bore filled with an electrically conductive fluid, the improvement which consists in employing as said fluid the conductive oil-base drilling fluid defined by claim 9.

23. In a well logging method wherein at least 1 electrode is positioned within a well bore filled with an electrically conductive fluid, the improvement which consists in employing as said fluid the conductive oil-base drilling fluid defined by claim 14.

References Cited in the file of this patent

UNITED STATES PATENTS

| Number | Name | Date |
|---|---|---|
| 2,216,955 | Moore | Oct. 8, 1940 |
| 2,552,775 | Fischer | May 15, 1951 |
| 2,557,647 | Gates | June 19, 1951 |
| 2,573,961 | Fischer | Nov. 6, 1951 |

OTHER REFERENCES

Serial No. 413,450, Hustinx (A. P. C.), published May 25, 1943.